US012782527B2

(12) United States Patent
S et al.

(10) Patent No.: US 12,782,527 B2
(45) Date of Patent: Nov. 3, 2026

(54) INTERFERENCE MITIGATION SYSTEM FOR OPERATING TIME-OF-FLIGHT CAMERA AND METHOD THEREOF

(71) Applicant: E-con Systems India Private Limited, Tamilnadu (IN)

(72) Inventors: Radhika S, Tamil Nadu (IN); Selva Mani S, Tamil Nadu (IN)

(73) Assignee: E-CON SYSTEMS INDIA PRIVATE LIMITED, Chennai (IN)

( * ) Notice: Subject to any disclaimer, the term of this patent is extended or adjusted under 35 U.S.C. 154(b) by 423 days.

(21) Appl. No.: 18/615,820

(22) Filed: Mar. 25, 2024

(65) Prior Publication Data

US 2025/0298131 A1 Sep. 25, 2025

(51) Int. Cl.

*G06F 15/16* (2006.01)
*G01S 7/484* (2006.01)
*G01S 7/4865* (2020.01)
*G01S 7/487* (2006.01)
*G01S 17/894* (2020.01)

(52) U.S. Cl.

CPC .............. *G01S 7/487* (2013.01); *G01S 7/484* (2013.01); *G01S 7/4865* (2013.01); *G01S 17/894* (2020.01)

(58) Field of Classification Search

CPC ........ G01S 7/484; G01S 7/487; G01S 7/4865; G01S 17/894
USPC .......................................................... 709/231
See application file for complete search history.

(56) References Cited

U.S. PATENT DOCUMENTS 9,945,948 B2 * 4/2018 Yang ........................ G01S 17/46
10,607,352 B2 * 3/2020 Ortiz Egea ........... G01S 17/894
11,108,957 B1 * 8/2021 Oh ........................ G01S 17/894
11,734,801 B2 * 8/2023 Ortiz Egea ........... G01S 17/894 382/106
11,763,425 B2 * 9/2023 Ma ........................ G01S 17/894 382/299
12,095,963 B2 * 9/2024 Ledergerber .......... G01S 17/894
12,452,396 B2 * 10/2025 Vu ........................ G01K 13/00
2016/0370462 A1 * 12/2016 Yang ..................... G01S 7/4815
2019/0355136 A1 * 11/2019 Ortiz Egea ........... G01S 17/894
2021/0212576 A1 * 7/2021 MacNeish ............ A61B 5/0816
2022/0174251 A1 * 6/2022 Ledergerber .......... G01S 17/894
2022/0245762 A1 * 8/2022 Ma ........................ G01S 17/894
2022/0357436 A1 * 11/2022 Mohan .................... G01S 17/06
2022/0383455 A1 * 12/2022 Ortiz Egea ........... G01S 17/894
2023/0162368 A1 * 5/2023 Varadarajan ............ G01S 17/86 382/106

(Continued)

*Primary Examiner* — Moustafa M Meky
(74) *Attorney, Agent, or Firm* — Rivka Friedman

(57) ABSTRACT

The interference mitigation system for operating multiple TOF cameras without interference comprises a network of TOF camera nodes comprising a first server camera node and one or more client camera nodes. The first server camera node and one or more client camera nodes operate at one or more frame rates. An interference control module and a wireless communication module are responsible for communication between first server camera node and one or more client camera nodes. The first server camera node and one or more client camera nodes share essential control packets between them. The camera nodes find their optimum frame rates to be set using these control packets. Further they calculate the time at which the camera device has to be triggered using the control packets for interference free operation.

24 Claims, 14 Drawing Sheets

(56) References Cited

U.S. PATENT DOCUMENTS

2024/0134053 A1* 4/2024 Isler .................... G06V 10/454
2024/0163415 A1* 5/2024 Vu ......................... G01K 13/00
2024/0230910 A9* 7/2024 Isler ....................... G01S 17/89
2025/0008067 A1* 1/2025 Ledergerber ............. G06T 7/50
2026/0169169 A1* 6/2026 Gil-Cacho ............. G01S 7/497

* cited by examiner

INTERFERENCE MITIGATION SYSTEM FOR OPERATING TIME-OF-FLIGHT CAMERA AND METHOD THEREOF

TECHNICAL FIELD

The present invention relates to a field of embedded camera. More particularly, the present invention relates to mitigation of interferences while operating multiple Time-of-Flight (TOF) cameras.

BACKGROUND OF THE INVENTION

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and therefore, unless otherwise indicated, it should not be assumed that any of the approaches described in this section qualify as prior art merely by virtue of their inclusion in this section.

A time-of-flight camera, often referred to as a TOF camera or time-of-flight sensor, constitutes a range imaging camera system designed to measure distances between the camera and a subject for each point within the image by leveraging the principle of time-of-flight. This involves the transmission of light pulses, or in some cases, a single light pulse. The operational principle of Time of Flight (TOF) cameras is the emission of a light source and the subsequent reception of the reflected light. By calculating the depth through the analysis of reflected light intensity and the time required for the light to travel back to the camera, TOF cameras facilitate accurate distance measurements.

Further, the TOF camera uses Time-of-Flight principle to measure depth data in a particular scene/scenario. The direct Time-of-Flight cameras calculate depth based on the round-trip time of emitted infrared radiation (IR) light in the scene. However, as the direct TOF calculation is more vulnerable to ambient noise, such as the other IR light/source, and limited to low resolution, indirect Time-of-Flight imaging is widely preferred. The indirect TOF cameras such as pulsed TOF or Continuous wave TOF calculate depth based on the change in phase of received IR light. Even though these cameras can provide accurate depth measurements in most conditions, they have their own set of issues and limitations. One such limitation is simultaneous operating of multiple TOF cameras in the same environment is very challenging. For example, when more than one TOF camera operates in the same region/environment with same IR wavelength, IR light from one camera interferes with other camera resulting in erroneous depth values, known as Multiple Camera Interference.

The multiple camera interference occurs since each TOF camera in the environment has its own light source and operates based on the flight time of the IR rays/light. Due to this there is a high possibility of the IR rays/lights from one TOF camera affecting the IR rays/lights of other TOF cameras causing interference.

However, this multiple camera interference can be avoided by using existing methods/techniques. For example, one of the existing methods used to avoid the multiple camera interference is by streaming one TOF camera during blanking period of other TOF cameras, as shown in FIG. 1. The blanking period is a period of inactive lines between end of one frame and beginning of next frame. For example, FIG. 1 shows the IR pulses of TOF camera 1, TOF camera 2 and TOF camera 3, where all the three TOF cameras avoid multiple camera interference by each TOF camera measuring the depth during the blanking period of other TOF cameras. Therefore, in this way, each TOF camera will operate at different time intervals by triggering multiple TOF cameras at different instances and making sure one TOF camera's active pulse doesn't overlap with other TOF camera's active pulse, to avoid multiple TOF camera interference. Further, by reducing frame rate of the TOF cameras, the blanking period can be extended to accommodate more cameras.

Further, let's consider that multiple TOF cameras are connected to a common host, in such a scenario an onboard chip is sufficient to send trigger pulses to different TOF cameras with different offsets. By doing so, the TOF cameras are triggered at different time intervals without multiple camera interference. Additionally, on connecting the multiple TOF cameras to different hosts, this approach is still relevant as long as the hosts are hardwired. However practically, it is not always possible to have hardwired connections between every single TOF camera.

In view of the above, the existing methods has certain inherent limitations. For example, by using blanking period/intervals, the existing methods may provide a short interval in frame time of a TOF camera to enable the depth measurement by other TOF cameras for an interference-free solution. However, this solution is limited to a certain number of TOF cameras with fixed and limited framerate. Further, the existing methods are inefficient due to a number of reasons. One of the main reasons is that the TOF cameras will be streamed at a fixed rate irrespective of the number of TOF cameras connected to a system. Hence, the blanking period/interval of each TOF camera is not fully utilized if the number of TOF cameras connected to the system is less. Further, another limitation of the existing method is that to operate each TOF camera at different frequencies, it requires different pulse configuration for each TOF cameras, which is very cumbersome to maintain for multiple TOF cameras. Further, one more limitation of the existing method is that, if different TOF cameras are to operate at different time intervals, the TOF cameras require hardwired connection between them, and a fixed limit is to be set for the frame rate, which is not possible for operating multiple TOF cameras. Therefore, there is a need for an improved methodology to operate the multiple TOF cameras in the same environment without any interference.

SUMMARY OF THE INVENTION

According to the main aspect of the present invention, the invention discloses an interference mitigation system for operating multiple Time-of-Flight (TOF) cameras. The interference mitigation system comprises a network of TOF camera nodes. The network of TOF camera nodes comprise at least one first camera node from the network of TOF camera nodes to serve as at least one first server camera node in the network of TOF camera nodes. Further, the network of TOF camera nodes comprise one or more other TOF camera nodes from the network of TOF camera nodes to function as one or more client camera nodes in the network of TOF camera nodes. Each of the at least one first server camera node and the one or more client camera nodes operate at one or more frame rates. Further, each of the at least one first server camera node and the one or more client camera nodes comprise an interference control module. The interference control module of the at least one first server camera node is configured to receive, one or more control packets from at least one of a client camera node of the one or more client camera nodes. The interference control module of the at least one first server camera node is configured to share, the one or more control packets with the one or more client camera nodes. Further, each client camera node from the one or more client camera nodes and the at least one first server camera node sets the one or more frame rates according to the receipt of the one or more control packets.

In another embodiment, the network of TOF camera nodes is operated in a wireless network.

In another embodiment, each of the at least first server camera node in the network of TOF camera nodes comprise a wireless adaptor with wireless communication module configured to: enable communication between the at least one first server camera node and the one or more client camera nodes.

In another embodiment, each of the at least first server camera node in the network of TOF camera nodes comprise a time synchronization module configured to: synchronize clocks of each of the at least one first server camera node and the one or more client camera nodes, wherein the synchronization of the clocks synchronizes operation of the one or more client camera nodes with the at least one first server camera node.

In another embodiment, the interference control module configured to set the one or more frame rates according to at least one of: a total number of the one or more client camera nodes upon receipt of the control packet, or when there is a change in the total number and TOF camera node ID.

In another embodiment, the interference control module configured to receive, one of an exit request or an entry request from one of the at least one first server camera node or one or more client camera nodes from the network of TOF camera nodes, the one or more client camera nodes and the at least one first server camera node set the one or more frame rates for the one or more client camera nodes and the at least first server camera node according to the exit request or the entry request.

In another embodiment, the interference control module configured to: receive an exit request from the at least one first server camera node. Transmit a notification about the exit of at least one first server camera node to the one or more client camera nodes. Select, at least one second camera node from the one or more client camera nodes as the server camera node, wherein the selection of the at least one second camera node is performed according to a selection priority set by the at least one first server camera node.

In another embodiment, the at least one first server camera node is configured to: receive, a connection request from a new TOF camera node in the wireless network. Connect the new TOF camera node as a new client camera node with the one or more client camera nodes. Transmit the at least one control packet to the new client camera node along with the one or more client camera nodes, wherein the one or more client camera nodes and the at least one first server camera node modify the one or more frame rates of each of the new client camera node along with the one or more client camera nodes and the at least one first server camera node, wherein the one or more frame rates are modified by decreasing each frame rate within a predefined range of the one or more frame rates.

In another embodiment, the at least one first server camera node is configured to: receive, a disconnection request from at least one of a client camera node of the one or more client camera nodes in the wireless network. Disconnect at least one of the client camera node from the at least first server camera node in the wireless network based on the disconnect request, wherein the at least one of the client camera node is a disconnected camera node. Transmit the at least one control packet to each of the one or more client camera nodes other than the disconnected camera node, wherein the one or more client camera nodes and the at least one first server camera node modify the one or more frame rates of each of the one or more client camera nodes other than the disconnected camera node and the at least first server camera node by increasing each frame rate within a predefined range of the one or more frame rates.

In another embodiment, the at least one control packet comprises data about a number of TOF camera nodes in the network of TOF camera nodes connected in the wireless network, TOF camera node ID for each of TOF camera node arranged to receive the at least one control packet, and a universal trigger time for each of TOF camera node.

In another embodiment, each of the at least one first server camera node or the one or more client camera nodes calculate a respective trigger time based on the universal trigger time and the TOF camera node ID, obtained through the control packet, wherein each of the at least one first server camera node and the one or more client camera nodes emits Infrared Rays (IR) to capture distance data according to the respective trigger time.

In another embodiment, the control packet is transmitted according to one of an exit request or an entry request received from one of the at least one first server camera node or one or more client camera nodes in the network of TOF camera nodes.

According to another main aspect of the present invention a method for operating multiple Time-of-Flight (TOF) cameras is provided. The method comprises selecting, at least one first camera node from a network of TOF camera nodes to serve as at least one first server camera node in the network of TOF camera nodes. The method comprises configuring, one or more other TOF camera nodes from the network of TOF camera nodes to function as one or more client camera nodes in the network of TOF camera nodes, wherein each of the at least one first server camera node and the one or more client camera nodes operate at one or more frame rates, and wherein each of the at least one first server camera node and the one or more client camera nodes comprises an interference control module. The method comprises receiving, through the interference control module of the at least one first server camera node, one or more control packets from at least one of a client camera node of the one or more client camera nodes. The method comprises sharing, through the interference control module, the one or more control packets with the one or more client camera nodes. The method comprises setting, through each client camera node from the one or more client camera nodes and the at least one first server camera node, the one or more frame rates according to the receipt of the one or more control packets.

BRIEF DESCRIPTION OF THE DRAWINGS

The invention will now be described in relation to the accompanying drawings in which.

DETAILED DESCRIPTION OF THE PREFERRED EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present invention provides an interference mitigation system for operating multiple TOF cameras in a wireless network. The interference mitigation system comprises a network of TOF camera nodes, in which a first camera node serves as a first server camera node and one or more other TOF camera nodes function as one or more client camera nodes. The first server camera node and the one or more client camera nodes operate at one or more frame rates. Each of the first server camera node and the one or more client camera nodes comprise interference control module. The interference control module of the first server camera node is configured to receive control packets from a client camera node of the one or more client camera nodes and share the received control packets with the one or more client camera nodes. Thereupon, each client camera node and the at least one first server camera node sets the one or more frame rates according to the receipt of the control packets. In this manner, the above-mentioned interference mitigation system is able to operate multiple TOF camera nodes without any occurrence of interference among the TOF camera nodes.

Figure 1:
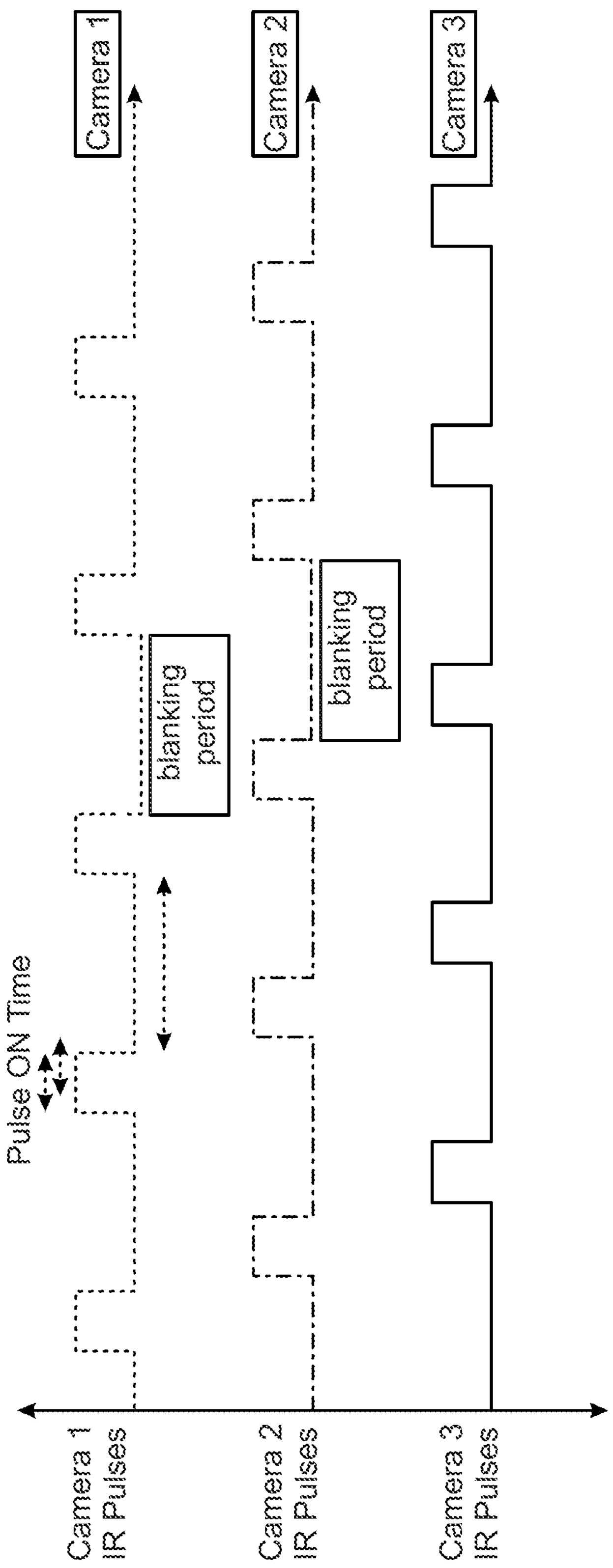
FIG. 1 illustrates an example of an existing/prior art method.
Figure 2:
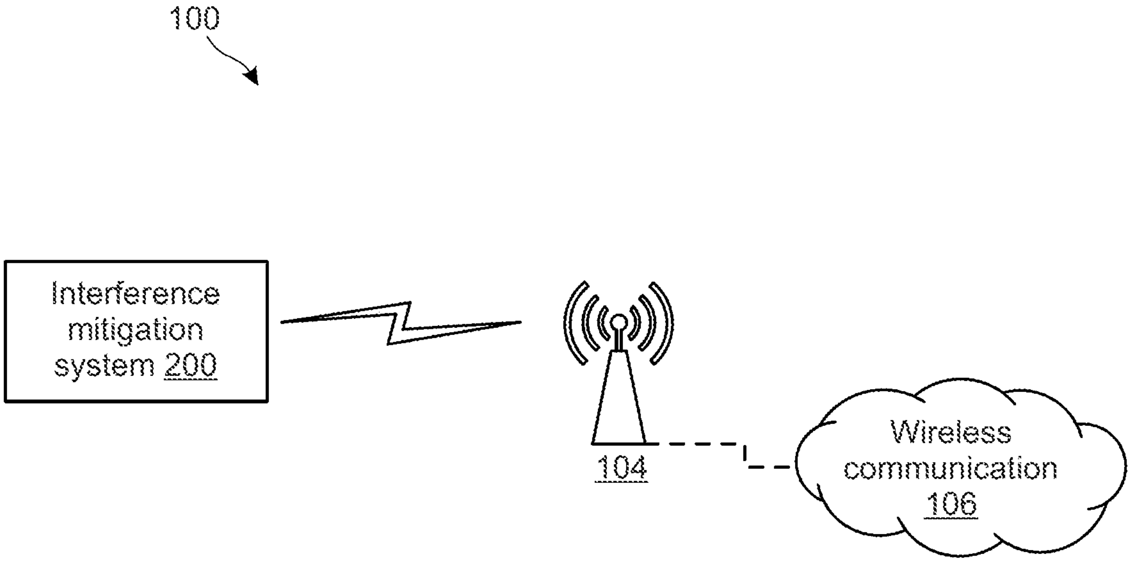
FIG. 2 discloses an example of a wireless communication system, according to some embodiments of the present invention.

FIG. 2 discloses an example wireless communication system 100. Although the subject matter described herein may be implemented in any appropriate type of system using any suitable components, the examples disclosed herein are described in related to a wireless communication system/wireless network, such as the example wireless communication system 100 described in FIG. 2.

The wireless communication system 100 may comprise and/or interface with any type of communication, telecommunication, data, cellular, and/or radio network or other similar type of system. The wireless communication system 100 may be configured to operate according to specific standards or other types of predefined rules of procedures. Thus, the wireless communication system 100 may implement communication standards, such as, but not limited to, global system for mobile communications, GSM, universal mobile telecommunications system, UMTS, long term evolution, LTE, and/or other suitable 2G, 3G, 4G, or 5G standards, wireless local area network, WLAN, standards such as, IEEE 802.11 standards, and/or any other appropriate wireless communication standards, such as, worldwide interoperability for microwave access, WiMax, Bluetooth, Z-Wave and/or ZigBee standards.

For simplicity, as depicted in FIG. 2, the wireless communication system 100 comprises an interference mitigation system 200, a network node 104, and a network 106. The interference mitigation system 200 and the network node 104 operate together in order to provide wireless connections in the wireless communication system 100. The network 106 may comprise one or more backhaul networks, core networks, IP networks, public switched telephone networks, PSTNs, packet data networks, optical networks, wide-area networks, WANs, local area networks, LANs, wireless local area networks, WLANs, wired networks, wireless networks, metropolitan area networks, and other networks to enable communication between devices (for example, wireless devices and a network node).

The network node 104 may refer to equipment capable, configured, arranged, and/or operable to and/or with other network nodes or equipment in the wireless communication system 100 to enable and/or provide wireless access and/or to perform other functions (for example, administration) in the wireless communication system 100. Examples of the network node 104 include, but are not limited to, access points, Aps (for example, radio access points), base stations, BSs (for example, radio base stations, nodeBs, evolved NodeBs, eNBs, new radio, NR, nodes (gNBs), or the like). The BSs may be categorized based on an amount of coverage the BSs provide (or, stated different, their transmit power level) and may then also be referred to as femto BSs, pico BSs, micro-BSs, macro-BSs. The BS may be a relay node or a relay donor node controlling a relay.

The interference mitigation system 200 may refer to a device capable, configured, arranged and/or operable to communicate wirelessly with the network node 104 and/or other wireless devices.

In some examples, the wireless devices may include one or more of: computing devices, wireless devices, ultra-low power wireless devices, Internet of Things, IoT, devices, and so on.

Examples of the computing devices may include, but are not limited to, a smart phone, a mobile phone, a cell phone, a voice over Internet Protocol, IP, VOIP, phone, a wireless local loop phone, a desktop computer, a personal digital assistant, PDA, a wireless camera, a gaming console or device, a wearable terminal device, a wireless endpoint, a mobile station, a tablet, a laptop, a laptop-embedded equipment, LEE, a laptop-mounted equipment, LME, a smart device, a wireless customer-premise equipment, CPE, a vehicle-mounted wireless terminal device, and so on.

It should be understood that the interference mitigation system 200 may not be limited to the above-described wireless devices. The interference mitigation system 200 may be extended to other wireless devices of different classes or categories providing different services while supporting, for example, Enhanced Mobile Broadband, eMBB, massive Machine-Type Communication, MTC, Ultra-Reliable Low Latency Communication, URLLC, Time Sensitive Networking, TSN, or the like.

In the wireless communication system 100, the network node 104 and the interference mitigation system 200 are connected to 3GPP 5G core network, where specific network services and operations are provided through software components called network functions, NFs. The wireless communication system 100 hosts large scale applications.

Figure 3:
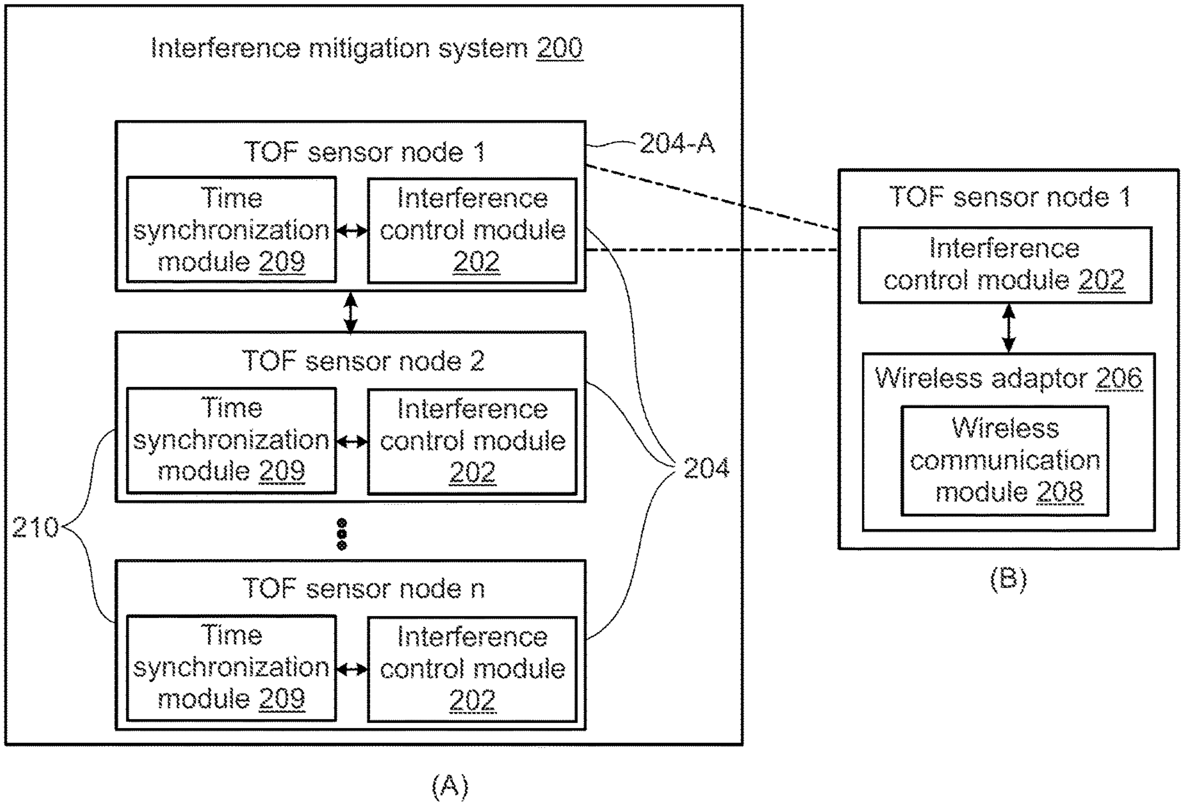
FIG. 3 discloses a block diagram of an example interference mitigation system for operating TOF cameras in the wireless network, according to some embodiments of the present invention.

FIG. 3 discloses a block diagram of an example interference mitigation system 200 for operating TOF cameras in the wireless network 106, according to some embodiments of the present invention.

According to at least some embodiments of the present invention, the interference mitigation system 200 in FIG. 3 comprises a processor, a user interface, and a memory along with one or more modules executed by the processor (not shown in FIG. 3).

The processor is configured to execute the interference control module 202. The memory may also serve as a repository for storing data processed, received, and transmitted by the interference control module 202. The memory may include any computer-readable medium or computer program product known in the art including, for example, volatile memory, such as Static Random-Access Memory, SRAM, and Dynamic Random-Access Memory, DRAM, and/or non-volatile memory, such as Read Only Memory, ROM, Erasable Programmable ROM, EPROM, Electrically Erasable and Programmable ROM, EEPROM, flash memories, hard disks, optical disks, and magnetic tapes.

The user interface may include a variety of software and hardware interfaces, for example, a web interface, a graphical user interface, a command line interface, and the like. The user interface may allow interaction with the interference mitigation system 200. The user interface may facilitate multiple communications within a wide variety of networks and protocol types, including wired networks, for example, LAN, cable, etc., and wireless networks, such as WLAN, cellular, or satellite to establish the communication between the interference mitigation system 200.

Again, referring to FIG. 3, the interference mitigation system 200 comprises a network of TOF camera nodes 204. The network of TOF camera nodes 204 comprises at least one first camera node, which serves as at least one first server camera node 204-A in the network of TOF camera nodes 204. Further, the network of TOF camera nodes 204 comprises one or more other TOF camera nodes from the network of TOF camera nodes 204 which functions as one or more client camera nodes 210 in the network of TOF camera nodes 204.

For example, in FIG. 3, TOF camera node 1 204-A may serve as the at least one first server camera node 204-A. while, other TOF camera nodes 204, such as TOF camera node 2 to TOF camera node 'n' may serve as the one or more client camera nodes 210.

Each of the at least one first server camera node 204-A and the one or more client camera nodes 210 operate at one or more frame rates. Further, each of at least one first server camera node 204-A and the one or more client camera nodes 210 comprises an interference control module 202.

The interference control module 202 of the at least first server camera node 204-A is configured to receive one or more control packets from at least one of a client camera node of the one or more client camera nodes 210. Further, the interference control module 202 of the at least first server camera node 204-A is configured to share the one or more control packets with the one or more client camera nodes 210. Thereupon, each client camera node from the one or more client camera nodes 210 and the at least one first server camera node 204-A sets the one or more frame rates according to the receipt of the one or more control packets.

In another embodiment, each of the at least first server camera node 204-A in the network of TOF camera nodes 204 comprise a wireless adaptor 206 with wireless communication module 208, as shown in FIG. 3. The wireless communication module 208 enables communication between the at least one first server camera node 204-A and the one or more client camera nodes 210.

In another embodiment, each of the at least first server camera node 204-A in the network of TOF camera nodes 204 comprise a time synchronization module 209, as shown in FIG. 3. The time synchronization module 209 synchronizes clocks of each of the at least one first server camera node 204-A and the one or more client camera nodes 210. The synchronization of the clocks synchronizes operation of the one or more client camera nodes 210 with the at least one first server camera node 204-A.

In another embodiment, the interference control module 202 of each of the at least one first server camera node 204-A and the one or more client camera nodes 210 is configured to set the one or more frame rates according to at least one of: a total number of the one or more client camera nodes 210 upon receipt of the control packet, or when there is a change in the total number and TOF camera node ID.

In another embodiment, the interference control module 202 is configured to receive, one of an exit request or an entry request from one of the at least one first server camera node 204-A or one or more client camera nodes 210 from the network of TOF camera nodes 204. The one or more client camera nodes 210 and the at least one first server camera node 204-A set the one or more frame rates for the one or more client camera nodes 210 and the at least one first server camera node 204-A according to the exit request or the entry request.

In another embodiment, the interference control module 202 is configured to: receive an exit request from the at least one first server camera node 204-A. The interference control module 202 is configured to transmit a notification about the exit of at least one first server camera node 204-A to the one or more client camera nodes 210. The interference control module 202 is configured to select at least one second camera node from the one or more client camera nodes 210 as the server camera node. The selection of the at least one second camera node is performed according to a selection priority set by the at least one first server camera node 204-A. For example, when a client camera node 210 joins the wireless network 106, it is assigned a TOF camera node ID by the at least one first server camera node 204-A. Further, when the at least one first server camera node 204-A announces its exit, the client camera node 210 from the one or more client camera nodes 210 with lowest TOF camera node ID switches to become the at least first server camera node 204-A.

In another embodiment, the at least one first server camera node 204-A is configured to: receive, a connection request from a new TOF camera node in the wireless network 106. The at least one first server camera node 204-A is configured to connect the new TOF camera node as a new client camera node with the one or more client camera nodes 210. The at least one first server camera node 204-A is configured to transmit the at least one control packet to the new client camera node along with the one or more client camera nodes 210. The one or more client camera nodes 210 and the at least one first server camera node 204-A modify the one or more frame rates of each of the new client camera node along with the one or more client camera nodes 210 and the at least one first server camera node 204-A. The one or more frame rates are modified by decreasing each frame rate within the predefined range of the one or more frame rates.

In another embodiment, the at least one first server camera node 204-A is configured to: receive, a disconnection request from at least one of a client camera node of the one or more client camera nodes 210 in the wireless network 106. The at least one first server camera node 204-A is configured to disconnect at least one of the client camera nodes from the at least first server camera node 204-A in the wireless network 106 based on the disconnect request. The at least one of the client camera nodes is a disconnected camera node. The at least one first server camera node 204-A is configured to transmit the at least one control packet to each of the one or more client camera nodes 210 other than the disconnected camera node. The one or more client camera nodes 210 and the at least one first server camera node 204-A modify the one or more frame rates of each of the one or more client camera nodes 210 other than the disconnected camera node and the at least first server camera node 204-A by increasing each frame rate within the predefined range of the one or more frame rates.

In another embodiment, the at least one control packet comprises data about a number of TOF camera nodes in the network of TOF camera nodes 204 connected in the wireless network 106, TOF camera node ID for each of TOF camera node arranged to receive the at least one control packet, and a universal trigger time for each of TOF camera node.

In another embodiment, each of the at least one first server camera node 204-A or the one or more client camera nodes 210 calculate a respective trigger time based on the universal trigger time and the TOF camera node ID, obtained through the control packet. Each of the at least one first server camera node 204-A and the one or more client camera nodes 210 emits IR to capture distance data according to the respective trigger time.

In another embodiment, the control packet is transmitted according to one of an exit request or an entry request received from one of the at least one first server camera node 204-A or one or more client camera nodes 210 in the network of TOF camera nodes 204.

In an example, the interference control module 202 may also be called as adaptive interference control module. In an example, the interference control module 202 may consist of a client-server application, which is running for communication between the at least one first server camera node 204-A and the one or more client camera nodes 210. In another example, the interference control module 202 may consist of a frame rate detection module for finding optimum frame rates and setting the one or more frame rates for the network of TOF camera nodes 204.

Further, the interference control module 202 as shown in FIG. 3, is a client-server-based protocol/the client-server application which may be deployed in either a wired system or wireless system for communication between the at least one first server camera node 204-A and the one or more client camera nodes 210.

In another example, the frame rate detection module (not shown in FIG. 3), may be configured to detect and set the one or more frame rates optimally so that the network of TOF camera nodes 204 may operate without causing interference to other TOF camera nodes in the network 106. The one or more frame rates are set based on the one or more control packets/communication packets received from the at least one first server camera node 204-A.

In an exemplary embodiment, the at least one first server camera node 204-A sends the one or more control packets/communication packets to the one or more client camera nodes 210 when a client camera node enters or exits the connection (i.e., the network of TOF camera nodes 204). The one or more control packets consists of data about the number of TOF camera nodes present in the network of TOF camera nodes 204 connected in the wireless network 106, the TOF camera node ID for each of the network of TOF camera nodes 204 arranged to receive the at least one control packet (i.e., the respective TOF camera node ID of the client camera node to which the control packet is shared), and a universal trigger time for each of the network of TOF camera nodes 204. Each of the network of TOF camera nodes 204 including all the one or more client camera nodes 210 and the at least one first server camera node 204-A uses the data present in the one or more control packets and calculates its individual trigger time and sets the one or more frame rates. In an example, optimum frame rates of the network of TOF camera nodes 204/TOF cameras are chosen by each of the network of TOF camera nodes 204 based on the data of the one or more control packets and integration time of the network of TOF camera nodes 204. The integration time is the time during which the TOF camera/network of TOF camera nodes 204 are active, i.e., the TOF camera/network of the TOF camera nodes 204 collects and accumulates light. Further, the integration time is used for frame rate calculation. The calculated optimum frame rates are then set to the TOF camera by the host/TOF camera nodes 204. Further, using the optimum frame rates, the network of TOF camera nodes 204 may dynamically change their frame rate and start stream on their calculated trigger time for interference free operation.

Figure 4:
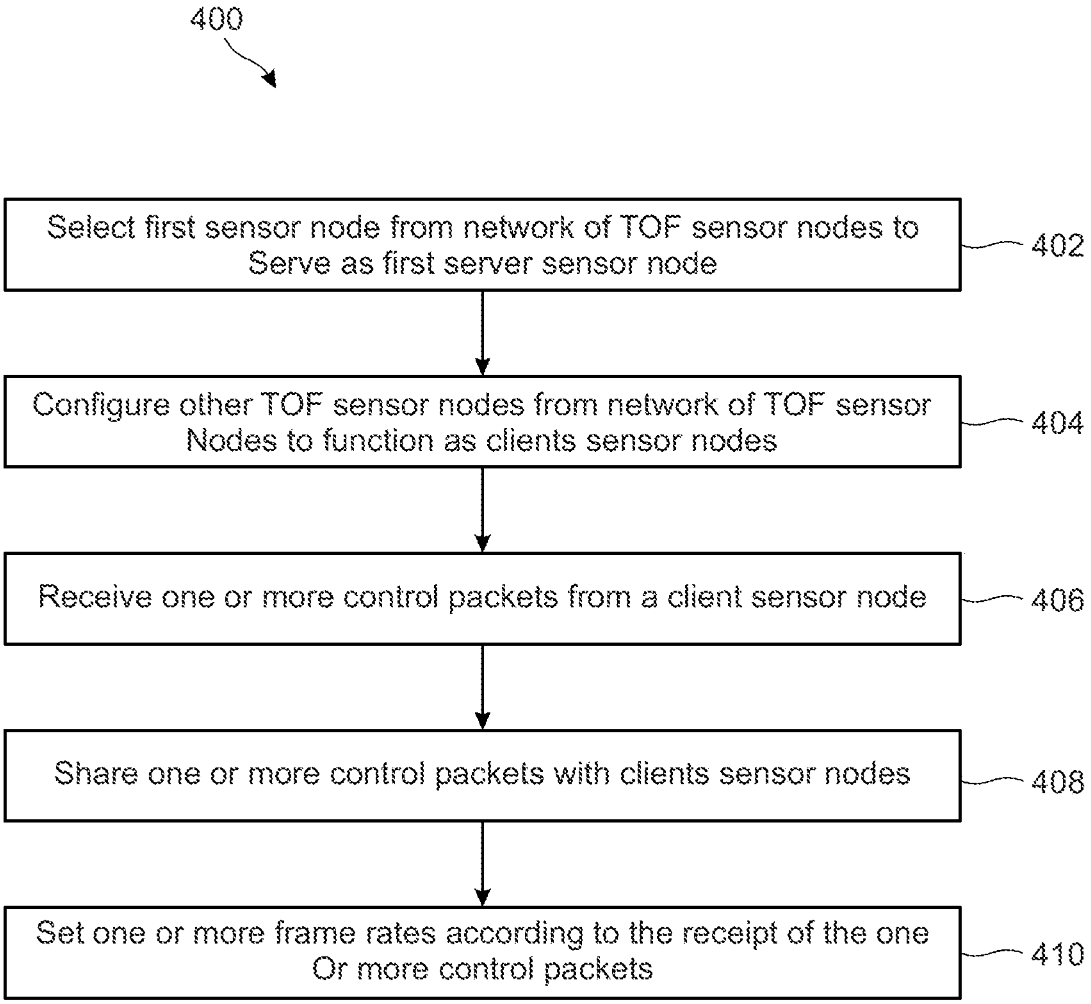
FIG. 4 illustrates a flowchart illustrating example method steps of a method performed by an interference mitigation system according to some embodiments of the present invention.

FIG. 4 illustrates a flowchart illustrating example method steps of a method performed by an interference mitigation system according to some embodiments of the present invention. The method 400 is performed by the interference mitigation system 200 for operating the multiple TOF cameras in the wireless network 106.

At step 402, the method 400 comprises selecting, the at least one first camera node from the network of TOF camera nodes 204 to serve as the at least one first server camera node 204-A in the network of TOF camera nodes 204.

At step 404, the method 400 comprises configuring, the one or more other TOF camera nodes from the network of TOF camera nodes 204 to function as the one or more client camera nodes 210 in the network of TOF camera nodes 204. Each of the at least one first server camera node 204-A and the one or more client camera nodes 210 operate at one or more frame rates, and wherein ach of the at least one first server camera node 204-A and the one or more client camera nodes 210 comprises the interference control module 202.

At step 406, the method 400 comprises receiving, through the interference control module 202 of the at least one first server camera node 204-A, the one or more control packets from at least one of a client camera node of the one or more client camera nodes 210.

At step 408, the method 400 comprises sharing, through the interference control module 202, the one or more control packets with the one or more client camera nodes 210.

At step 410, the method 400 comprises setting, through each client camera node from the one or more client camera nodes 210 and the at least one first server camera node 204-A, the one or more frame rates according to the receipt of the one or more control packets.

Figure 5A:
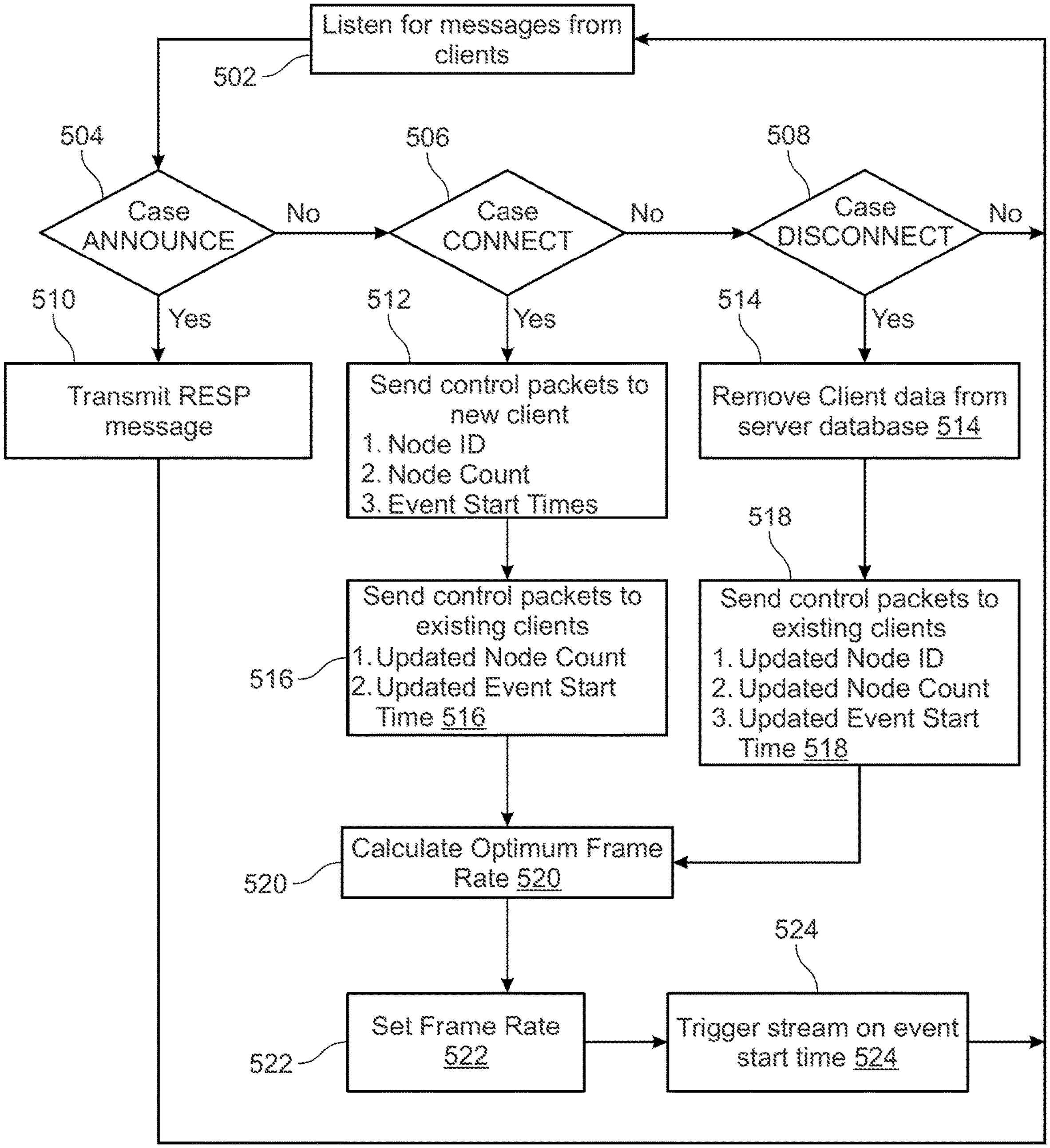
FIGS. 5*a* and 5*b* illustrate flowcharts for operating TOF cameras in the wireless network, according to some embodiments of the present invention.
Figure 5B:
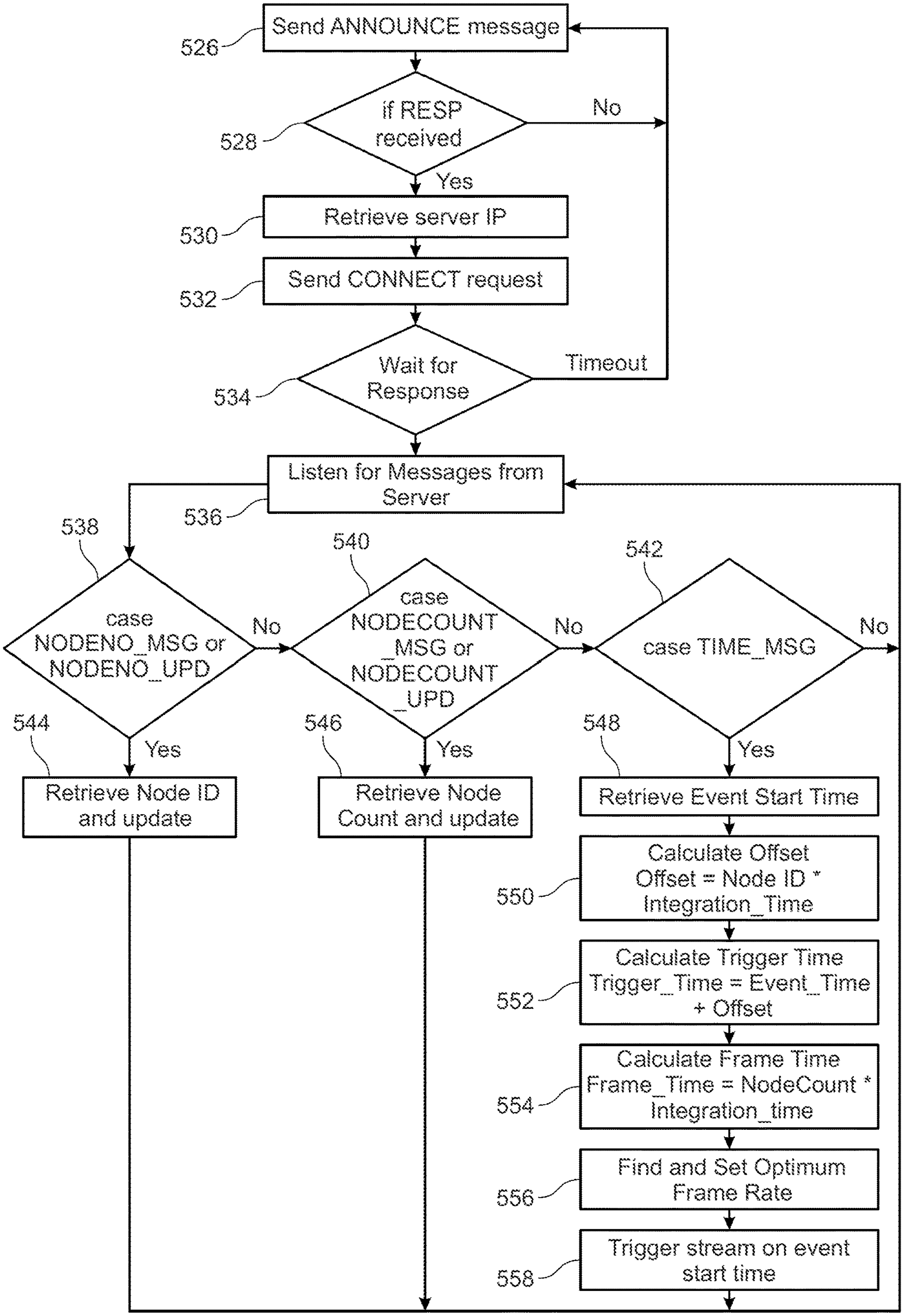

FIGS. 5*a* and 5*b* illustrate flowcharts for operating TOF cameras in the wireless network 106, according to some embodiments of the present invention.

In an exemplary embodiment, there are two command line applications. The command line applications, also known as console applications, are computer programs designed to be used from a text interface. In this scenario, one command line application is for the at least one first server camera node 204-A and the other command line application is for the one or more client camera nodes. In an example, a server application runs in the at least one first server camera node 204-A and a client application runs in the one or more client camera nodes 210. The server application and the client application utilise User Datagram Protocol (UDP) as its transport protocol over Internet protocol (IP) for communication between the at least one first server camera node 204-A and the one or more client camera nodes 210. In an exemplary embodiment, a person skilled in the art may understand that any transport protocol may be utilised for communication between the at least one first server camera node 204-A and the one or more client camera nodes 210 and is not limited to the UDP as mentioned above.

In another exemplary embodiment, the at least one first camera node from the network of TOF camera nodes 204 acts as the at least one first server camera node 204-A and remaining one or more TOF camera nodes from the network TOF camera nodes 204 act as the one or more client camera nodes 210. In an example, the at least one first server camera node 204-A is configured to authorize the joining and leaving requests, i.e., the entry and exit requests of the one or more client camera nodes 210 from the network of TOF camera nodes 204. Further, for example, if a new TOF camera node/host wants to join the connection, i.e., the network of the TOF camera nodes 204, then, the new TOF camera node needs to initiate an entry request to the at least one first server camera node 204-A. Upon initiation, the entry request of the new TOF camera node may be authorized by the at least one first server camera node 204-A. Similarly, for example, if one of a client camera node from the one or more client camera nodes 210 no longer wants to be in the connection, i.e., the network of the TOF camera nodes 204, then, the client camera node needs to inform the at least one first server camera node 204-A and exit the connection. Thus, in this manner, the at least one first server camera node 204-A handles the incoming entry and exist requests from the one or more client nodes 210.

In another example, let's consider a condition where the at least one first server camera node 204-A wants to exit the network of TOF camera nodes 204. In such a scenario, the at least one first server camera node 204-A needs to notify about its exit to the one or more client camera nodes 210 and exit the connection, i.e., the network of the TOF camera nodes 204. In this case, one of the remaining client camera nodes 210 may switch to act as a second server camera node based on priority assigned by the at least one first server camera node 204-A. Thus, each of the network of TOF camera nodes 204 is capable of switching its state from client camera node to server camera node if required, allowing it to operate without any interruption. Further, since the TOF camera node acts as server camera node, there is no need for central dedicated server requirement.

In another exemplary embodiment, message types used between the at least one first server camera node 204-A and the one or more client camera nodes 210 is explained. In an example, the one or more client camera nodes 210 and the at least one first server camera node 204-A share an 8-bit message between them to exchange information which is listed in below Table 1.

TABLE 1

| Message byte | Message Flow |
|---|---|
| CONNECT - 0xF0 | Client -> Server |
| DISCONNECT - 0xE0 | Client -> Server |
| ANNOUNCE - 0xD0 | Client -> Server |
| RESP - 0xC0 | Server -> Client |
| NODENO_MSG - 0x10 | Server -> Client |
| NODENO_UPD - 0x20 | Server -> Client |
| NODECOUNT_MSG - 0x30 | Server -> Client |
| NODECOUNT_UPD - 0x40 | Server -> Client |
| TIME_MSG - 0x60 | Server -> Client |

In an example, bits 4 to 7 represent the type of message shared. In another example, bits 0 to 3 are used to share the actual information such as TOF camera node ID and TOF camera node count etc. The at least one first server camera node 204-A uses the first 4 bits (i.e., bit 0 to 3) of NODENO_MSG, NODENO_UPD, NODECOUNT_MSG and NODECOUNT_UDP to specify the TOF camera node ID. For example, when one of the client camera nodes from the one or more client camera nodes 210 wants to disconnect from the network of TOF camera nodes 204, the client camera node replaces the first 4 bits (i.e., bits 0 to 3) of DISCONNECT message with its TOF camera node ID and sends it to the at least one first server camera node 204-A. In an example, since 4 bits are used to represent the TOF camera node IDs, a maximum of 15 TOF camera nodes are possible in a connection/network of TOF camera nodes 204. For example, bits size may be increased to accommodate more number of TOF camera nodes 204 by decreasing the one or more frame rates and is not limited to 15 TOF camera nodes as mentioned above. In an example, the camera node ID of the at least one first server camera node is always 1. In an example, TIME_MSG from the at least one first server camera node 204-A to the one or more client camera nodes 210 is always followed by actual time. Once the TIME_MSG is sent, the at least one first server camera node 204-A follows up with actual time data of 8 bytes.

In an exemplary embodiment, FIG. 5*a* shows the at least one first server camera node 204-A process. In an example, at step 502, the at least one first server camera node 204-A continuously monitors the one or more client camera nodes 210 to check if messages and requests are received from the one or more client camera nodes 210. The at least one first server camera node 204-A may receive three kinds of messages. The three kinds of messages include, ANNOUNCE, CONNECT and DISCONNECT. In an example, if the message received is other than the above three types, then the at least one first server camera node 204-A server drops that message. In an example, at step 504, on receiving the ANNOUNCE message (i.e., it is a multicast message) from one of the one or more client camera nodes 210, the at least one first server camera node 204-A responds with a RESP message as shown at step 510 of FIG. 5*a*. In an example, at step 506, on receiving the CONNECT message, the at least one first server camera node 204-A stores data of the client camera node such as IP address and Port number. Thereupon, the at least one first server camera node 204-A assigns a camera node ID to the client camera node. Then, the at least one first server camera node 204-A sends NODENO_MSG and NODECOUNT_MSG to the client camera node as shown at step 512 of FIG. 5*a*. Also, at step 516, the at least one first server camera node 204-A sends control packet comprising NODECOUNT_UPD to existing client camera nodes. Thereafter, the at least one first server camera node 204-A sends TIME_MSG followed by universal trigger time to all the one or more client camera nodes 210 as shown at step 516 of FIG. 5*a*. Further, at step 520, each of the one or more client camera nodes 210 calculates its own start time/trigger time and sets the one or more frame rates within the predefined range of the one or more frame rates as shown at step 522 of FIG. 5*a*. Thereafter, at step 524, each of the one or more client camera nodes 210 and the at least one first server camera node 204-A triggers stream on their start time.

In another example, at step 508, on receiving the DISCONNECT message, the at least one first server camera node 204-A retrieves the camera node ID that wants to disconnect from the network of TOF camera nodes 204 from the DISCONNECT message. Thereafter, at step 514, the at least one first server camera node 204-A removes the data related to that client camera node from its memory. Further, at step 518, the at least one first server camera node 204-A reassigns the camera node ID and sends NODENO_UPD to the required client camera nodes (i.e., remaining client camera nodes). Then, at step 518, the at least one first server camera node 204-A sends the NODECOUNT_UPD to all the one or more client camera nodes 210. Then, at step 518, the at least one first server camera node 204-A sends the TIME_MSG followed by universal trigger time to all the one or more client camera nodes 210. Further, at step 520, each of the one or more client camera nodes 210 calculates its own start time/trigger time and sets the one or more frame rates within the predefined range of the one or more frame rates as shown at step 522 of FIG. 5*a*. Thereafter, at step 524, each of the one or more client camera nodes 210 and the at least one first server camera node 204-A triggers stream on their start time.

In an exemplary embodiment, FIG. 5*b* shows the one or more client camera nodes 210 process. In an example, the one or more client camera nodes 210 keeps looking for messages from the at least one first server node 204-A. The one or more client camera nodes 210 are connected to the at least one first server camera node 204-A. In an example, the one or more client camera nodes 210 may send the ANNOUNCE message to the network of TOF camera nodes 204, as shown at step 526 of FIG. 5*b* and may receive the following types of messages. First, the RESP message is received at step 528. In this case, the one or more client camera nodes 210 after sending the ANNOUNCE message to the network of TOF camera nodes 204 may receive the RESP message from the server camera node 204-A of the network of TOF camera nodes 204. However, if the one or more client camera nodes 210 does not receive the RESP message, it retransmits the ANNOUNCE message until the RESP message is received from the server camera node 204-A of the network of TOF camera nodes 204. Further, on receiving the RESP message, at step 530, the one or more client camera nodes 210 retrieves IP address of the at least one first server camera node 204-A. Then at step 532, the one or more client camera nodes 210 sends the CONNECT message to that IP address. At step 534, the one or more client camera nodes 210 may wait for response from the at least one first server camera node 204-A for the CONNECT request. If a predefined time is out, the one or more client camera nodes 210 may send the ANNOUNCE message again to the network of TOF camera nodes 204.

At step 536, the one or more client camera nodes 210 may listen for message from the at least one first server camera node 204-A. In another example, at step 538, the one or more client camera nodes 210 may receive the NODENO_MSG message. In this case, at step 544, the one or more client camera nodes 210 retrieves its camera node ID from the first 4 bits (i.e., bit 0 to 3) of the NODENO_MSG message. In another example, at step 538, the one or more client camera nodes 210 may receive the NODENO_UPD message. In this case, at step 544, the one or more client camera nodes 210 retrieves the updated camera node ID from the first 4 bits (i.e., bit 0 to 3) of the NODENO_UDP message and updates the camera node ID. In another example, at step 540, the one or more client camera nodes 210 may receive the NODECOUNT_MSG message. In this case, at step 546, the one or more client camera nodes 210 retrieves the camera node count from the first 4 bits (i.e., bit 0 to 3) of the NODECOUNT_MSG message. In another example, at step 540, the one or more client camera nodes 210 may receive the NODECOUNT_UPD message. In this case, at step 546, the one or more client camera nodes 210 retrieves the updated camera node count from the first 4 bits (i.e., bit 0 to 3) of the NODENO_COUNT message and updates the camera node count in the network of TOF camera nodes 204. In another example, at step 542, the one or more client camera nodes 210 may receive the TIME_MSG message. In this case, at step 548, the one or more client camera nodes 210 receives the universal trigger time. Thereupon, at step 550, the one or more client camera nodes 210 calculates offset from the camera node ID, the camera node count and camera's integration time. Then, at step 552, the one or more client camera nodes 210 adds the offset to common trigger time to obtain its start time/trigger time. At step 554, the one or more client camera nodes 210 calculate the one or more frame time from the camera node ID, the camera's integration time and the camera node count. At step 556, the one or more client camera nodes 210 sets the one or more frame rates. At step 558, the one or more client camera nodes 210 triggers stream on their start time.

Figure 6A:
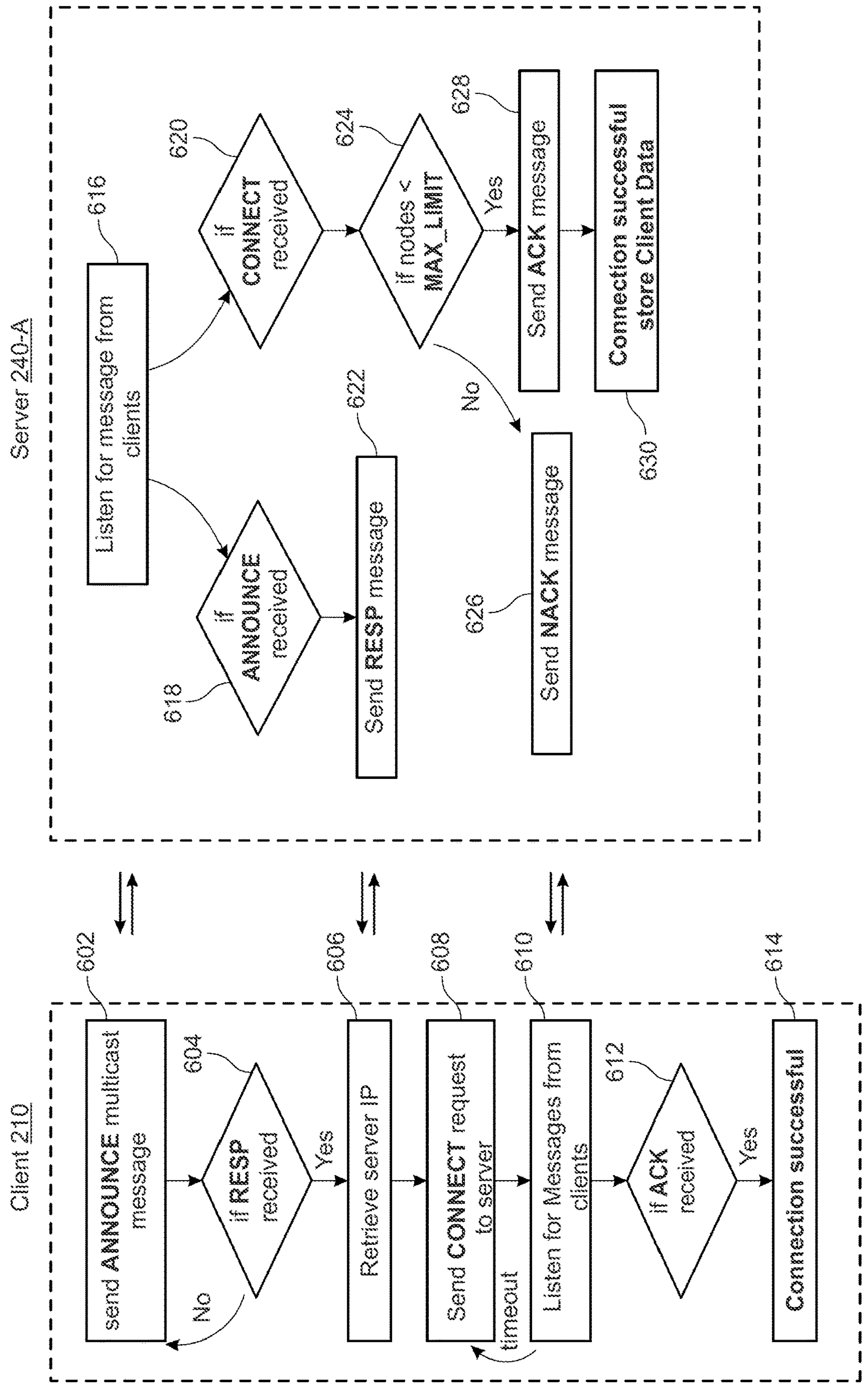
FIGS. 6*a*-6*c* illustrate flowcharts showing different scenarios of operating TOF cameras in the wireless network, according to some embodiments of the present invention.
Figure 6B:
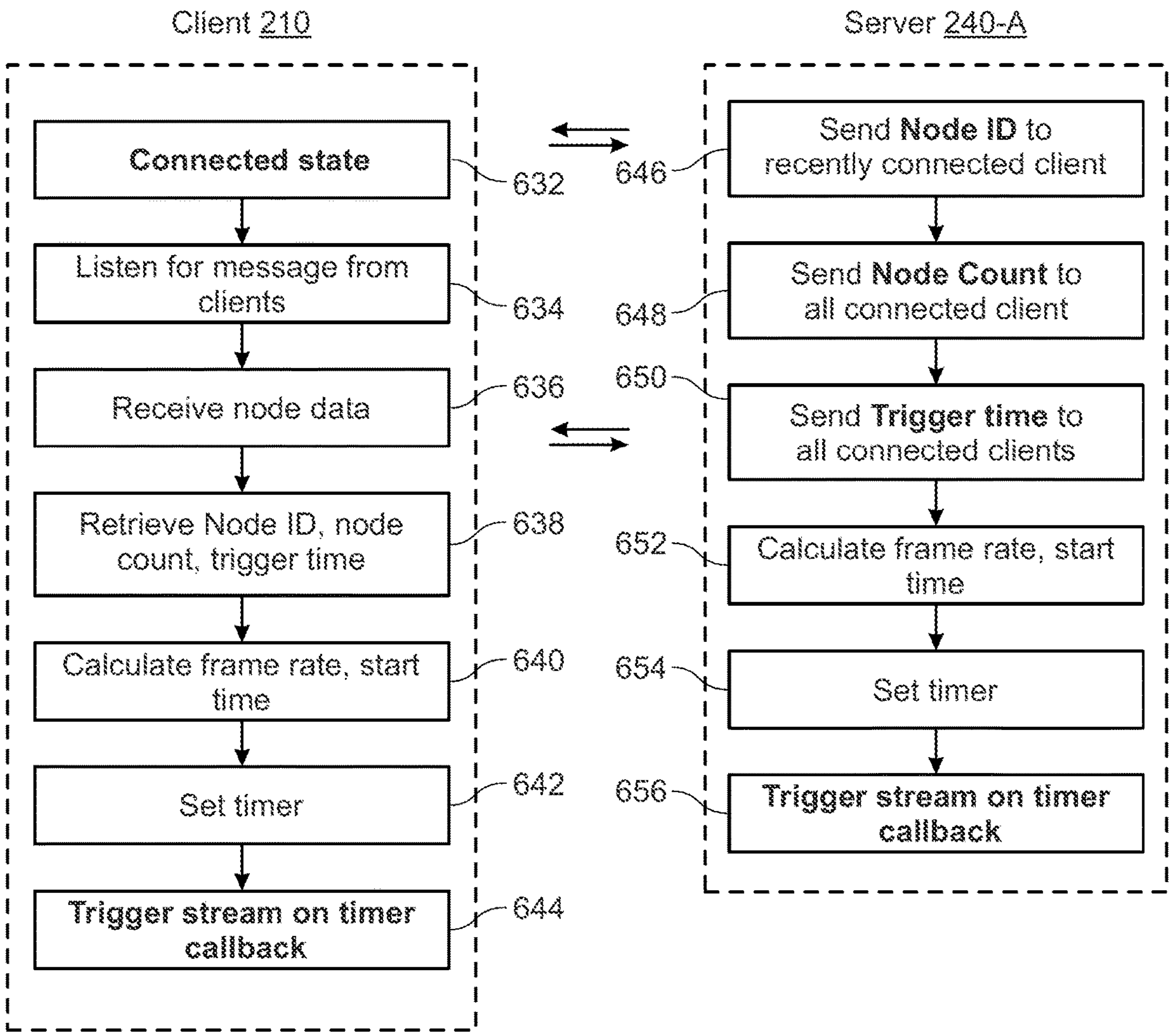
Figure 6C:
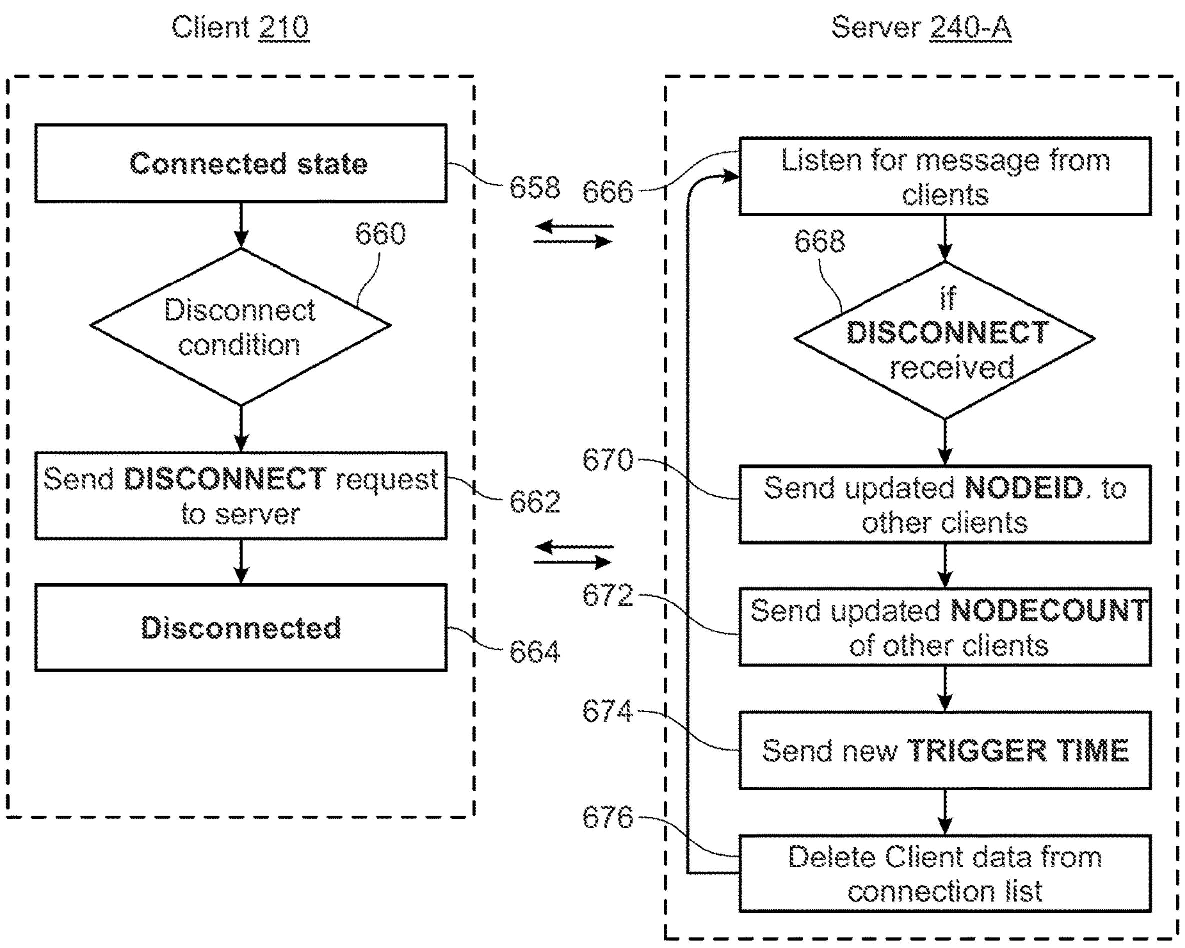

FIGS. 6*a*-6*c* illustrate flowcharts showing different scenarios of operating TOF cameras in the wireless network 106, according to some embodiments of the present invention.

In an exemplary embodiment, the interference mitigation system 200 consists of TOF camera cameras, hosts systems/at least one first server camera node 204-A to run TOF modules, wireless communication module 208 and interference control module 202 (also referred as adaptive interference control module). In an example, the main aim of the interference mitigation system 200 is to operate multiple TOF cameras connected wirelessly over a network without any interference in the same environment at the maximum possible framerates based on the number of TOF cameras operating in the same region/environment. The TOF cameras running on the at least one first server camera node 204-A consists of the wireless adaptor 206 with the wireless communication module 208 for radio communication between the network of TOF camera nodes 204. The time synchronization module 209 is also used to run clock synchronization methods within the network of TOF camera nodes 204 so that the clocks of the connected TOF camera nodes 204 are synchronized and running in sub-millisecond level accuracy. The synchronization method helps to correct the clock of each of the network of TOF camera nodes 204 if any drift occurs. In another example, the TOF module is capable of running at different frame rates allowing it to change its frame rate when necessary. In another example, the interference control module 202 is a client-server-based application which runs on the TOF camera nodes 204. The interference mitigation system 200 establishes a controlled connection over the network of TOF camera nodes 204 for communication between them, in order to share various timing and camera node data which is used for taking crucial decisions in the TOF camera nodes 204. Further, the network of TOF camera nodes 204 with the TOF modules, the interference control module 202 and the frame rate detection module combine to work, connect, communicate, and share necessary information to make the TOF cameras operate together in the same environment without any interference.

In an exemplary embodiment, FIG. 6*a* shows connection establishment between the at least one first server camera node 204-A and the one or more client camera nodes 210.

For example, initially, at step 616, the at least one first server camera node 204-A, shown in FIG. 3 is configured to listen for message from the one or more client camera nodes 210. Then, at step 602, the one or more client camera nodes 210 sends the ANNOUNCE multicast message to the network of TOF camera nodes 204. At step 618, the at least one first server camera node 204-A receives the ANNOUNCE multicast message. Then at step 622, the one first server camera node 204-A sends the RESP message to the one or more client camera nodes 210. At step 604, the one or more client camera nodes 210 receives the RESP message. At step 606, the one or more client camera nodes 210 retrieve the IP address of the at least one first server camera node 204-A from the RESP packet. Thereafter, at step 608, the one or more client camera nodes 210 sends the CONNECT request to the at least one first server camera node 204-A. At step 620, the at least one first server camera node 204-A receives the CONNECT request from the one or more client camera nodes 210. Then, at step 624, the at least one first server camera node 204-A checks if the number of camera nodes in the network of TOF camera nodes 204 is less than MAX_LIMIT. If the number of camera nodes in the network of TOF camera nodes 204 is not less than MAX_LIMIT, the at least one first server camera node 204-A sends NACK message to the one or more client camera nodes 210 as shown at step 626 FIG. 6*a*. At step 610, the one or more client camera nodes 210 listens for message from the at least first server camera node 204-A for a predefined time period. Once, the predefined time period is out, the one or more client camera nodes send the CONNECT request to the at least one first server camera node 204-A again. However, if the number of camera nodes in the network of TOF camera nodes 204 is less than MAX_LIMIT, the at least one first server camera node 204-A sends the ACK message to the one or more client camera nodes 210 as shown at step 628 of FIG. 6*a*. At step 612, once, the one or more client camera nodes 210 receives the ACK message, then at step 614, connection is successful established between the one or more client camera nodes 210 and the at least one first server camera node 204-A. Further, at step 630, the at least one first server camera node 204-A also stores the data of the one or more client camera nodes 210.

In an exemplary embodiment, FIG. 6*b* shows detection of the one or more frame rates between the at least one first server camera node 204-A and the one or more client camera nodes 210.

For example, once the one or more client camera nodes 210 and the at least one first server camera node 204-A are connected as shown at step 632, the at least one first server camera node 204-A receives the one or more control packets from one of the one or more client camera nodes 210. Upon receiving, at step 646, the at least one first server camera node 204-A sends the camera node ID to a recently connected client camera node. Also, at step 648, the at least one first server camera node 204-A sends the camera node count to all the one or more client camera nodes 210. Further, at step 650, the at least one first server camera node 204-A sends universal trigger time to the one or more client camera nodes 210. Thereafter, at step 634, the one or more client camera nodes 210 listens for messages from the at least one first server camera node 204-A. at step 636, the one or more client camera nodes 210 receives the camera node data. Further, at step 638, the one or more client camera nodes 210 retrieves the camera node ID, the camera node count and the universal trigger time from the received camera node data. Thereafter, at step 640 and 652, each of the one or more client camera nodes 210 and the at least one first server camera node 204-A calculates the optimum frame rates and their respective start time/trigger time, respectively. At step 642, the one or more client camera nodes 210 sets their trigger timers. Similarly, at step 654, the at least one first server camera node 204-A sets its trigger timer. Thereafter, at step 644 and 656, each of the one or more client camera nodes 210 and the at least one first server camera node 204-A trigger stream at their calculated start time without any interference.

In an exemplary embodiment, FIG. 6*c* shows disconnect event between the at least one first server camera node 204-A and the one or more client camera nodes 210.

For example, once the one or more client camera nodes 210 and the at least one first server camera node 204-A are connected as shown at step 658, the one or more client camera nodes 210 may have a requirement for disconnect from the network of TOF camera nodes 204 as shown at step 660 of FIG. 6*c*. In such a scenario, at step 662, the one or more client camera nodes 210 sends the DISCONNECT request to the at least one first server camera node 204-A. At step 666, the at least one first server camera node 204-A listens for message from the one or more client camera nodes 210. At step 668, the at least one first server camera node 204-A receives the DISCONNECT message. Then at step 670, the at least one first server camera node 204-A sends updated camera node ID (NODENO_UPD) to other client camera nodes 210. Also, at step 672, the at least one first server camera node 204-A sends updated node count (NODECOUNT_UPD) to other client camera nodes 210. Further, at step 674, the at least one first server camera node 204-A sends a new trigger time and at step 676, deletes the data of the client camera node from the network of TOF camera nodes 204. Thereafter, at step 664, the client camera node of the one or more client camera nodes 210 is disconnected from the at least one first server camera node 204-A.

FIGS. 7*a*-7*d* illustrates different scenario examples for operating TOF cameras in the wireless network 106, according to some embodiments of the present invention.

Figure 7A:
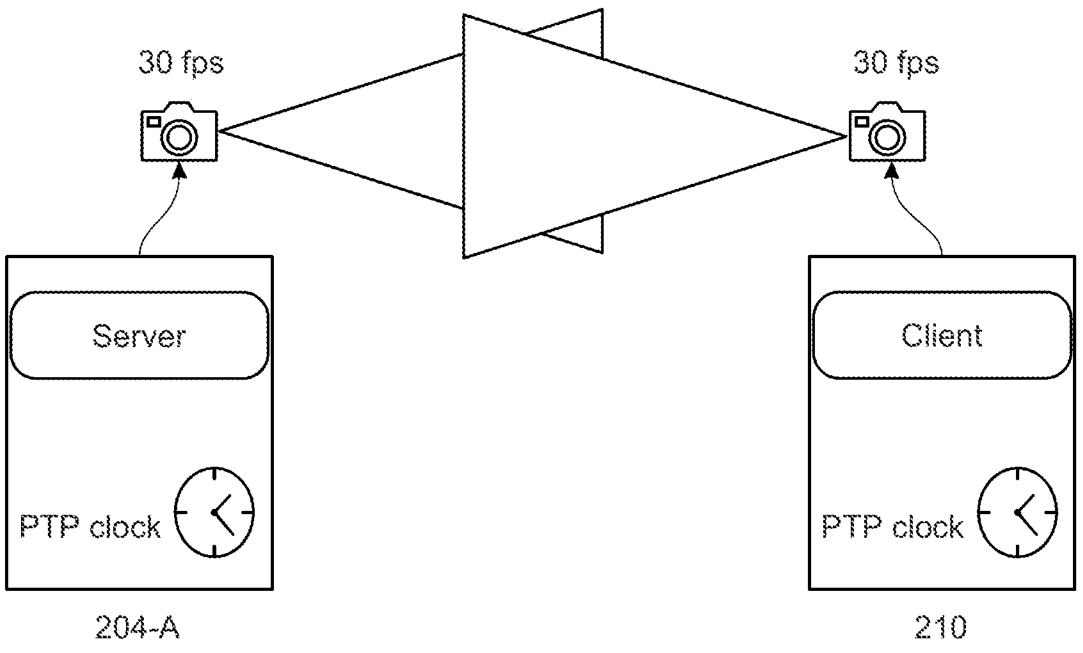
FIGS. 7*a*-7*d* illustrates different scenario examples for operating TOF cameras in a wireless network, according to some embodiments of the present invention.

For example, FIG. 7*a* shows the at least one first server camera node 204-A and one client camera node 210. The at least one first server camera node 204-A and the client camera node 210 stream at 30 fps (i.e., 30 frames per second) in the same environment, which results in the interference as shown in FIG. 7*a*.

Figure 7B:
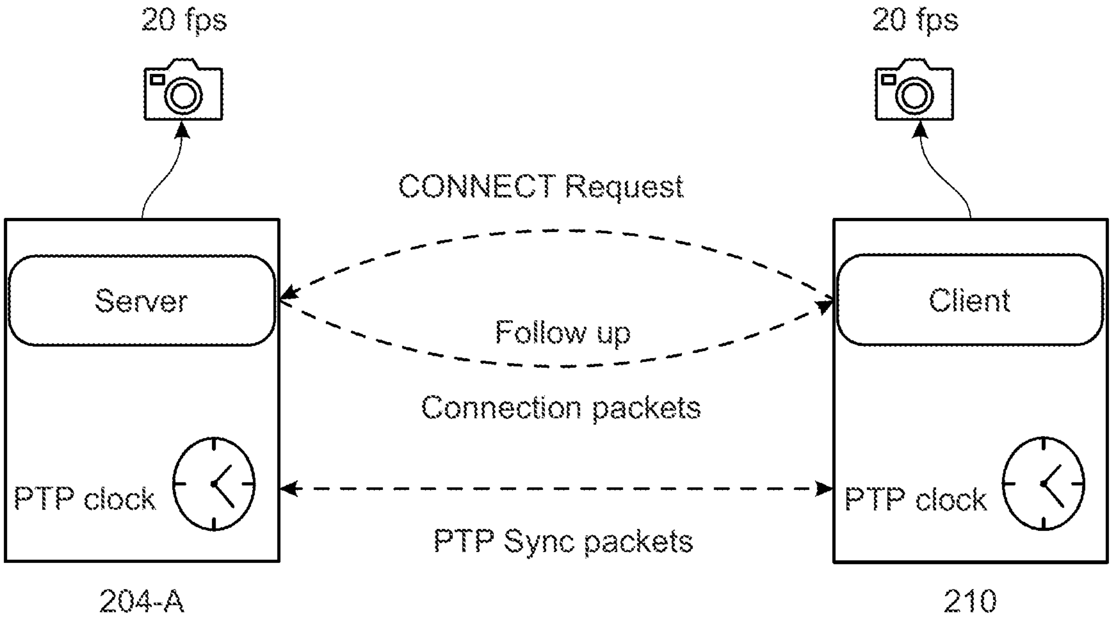

For example, FIG. 7*b* shows connection between the at least one first server camera node 204-A and the client camera node 210. The client camera node 210 sends CONNECT request/entry request to the at least one first server camera node 204-A to form the network of TOF camera nodes 204. Further, the at least one first server camera node 204-A on receiving the CONNECT request, sends control packets/connection packets to the client camera node 210 and calculates the frame rates. In this case, the initial 30 fps (shown in FIG. 7*a*) is reduced to 20 fps. In another example, the clocks (i.e., Precious Time Protocol, PTP clock) of the at least one first server camera node 204-A and the client camera node 210 is synchronized for working together before the connection is established between the nodes.

Figure 7C:
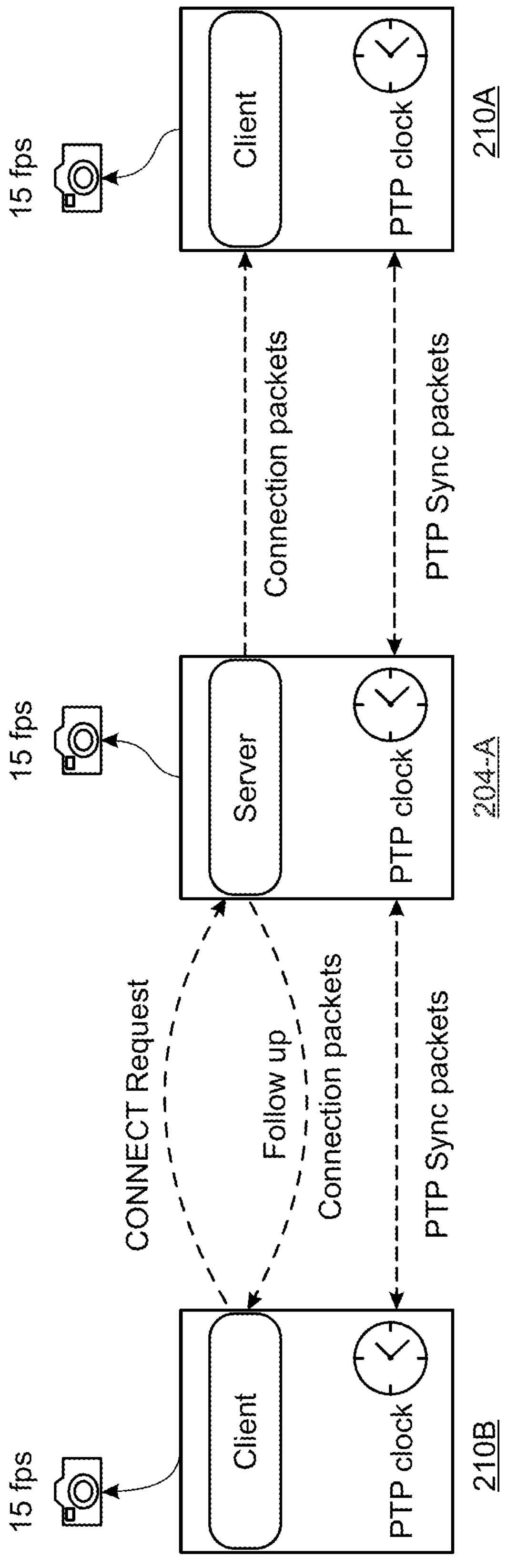

For example, FIG. 7*c* shows connection between the at least one first server camera node 204-A and two client camera nodes 210. The client camera node 210-A may be already connected with the at least one first server camera node 204-A. While the client camera node 210-B may send CONNECT request/entry request to the at least one first server camera node 204-A to form the network of TOF camera nodes 204. Further, the at least one first server camera node 204-A on receiving the CONNECT request, sends control packets/connection packets to the client camera nodes 210-A and 210-B. Further, the client camera nodes 210-A, 210-B and the at least one first server camera node 204-A calculates the frame rates. In this case, the 20 fps (shown in FIG. 7*b*) is reduced to 15 fps. In another example, the clocks of the at least one first server camera node 204-A and the client camera nodes 210-A and 210-B is synchronized for working together before the connection is established between the nodes.

Figure 7D:
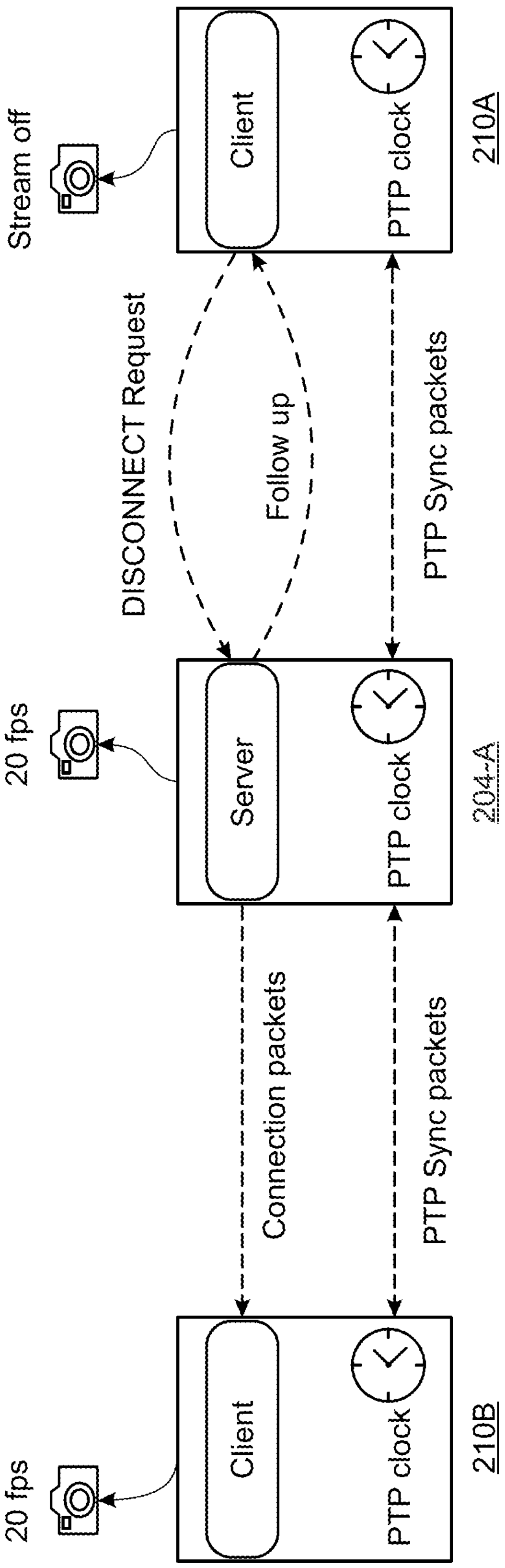

For example, FIG. 7*d* shows disconnection between the at least one first server camera node 204-A and one client camera node of the two client camera nodes 210. The client camera node 210-A and 210-B may be already connected with the at least one first server camera node 204-A. For example, the client camera node 210-A may send DISCONNECT request/exit request to the at least one first server camera node 204-A to exit from the network of TOF camera nodes 204. The client camera node 210-A then stops streaming and exits the wireless network 106. Further, the at least one first server camera node 204-A on receiving the DISCONNECT request, sends control packets/connection packets to the client camera node 210-B. Further, the client camera node 210-B and the at least one first server camera node 204-A calculates the frame rates. In this case, the 15 fps (shown in FIG. 7*c*) is increased to 20 fps. In another example, the clocks of the at least one first server camera node 204-A and the client camera nodes 210-B is synchronized for working together before the connection is established between the nodes.

Figure 8:
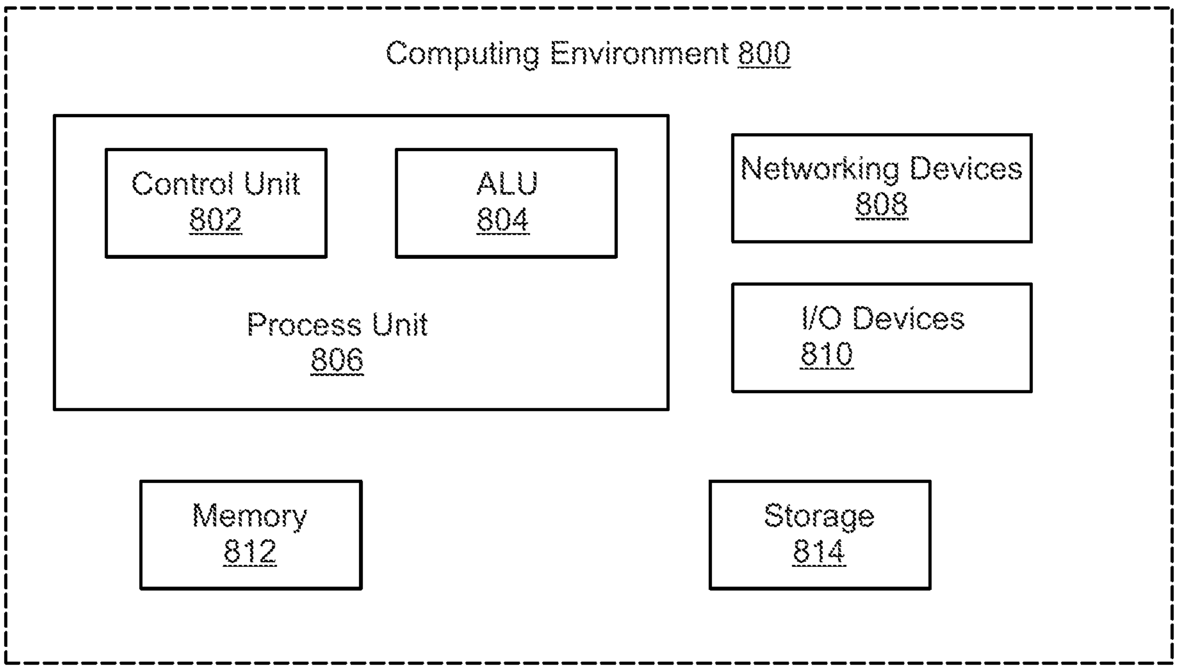
FIG. 8 discloses an example computing environment, according to some embodiments of the invention.

FIG. 8 discloses an example computing environment, according to some embodiments of the invention.

FIG. 8 illustrates an example computing environment 800 implementing an interference mitigation system 200 and a method 400 as shown in FIGS. 3, and 4 for operating multiple TOF cameras in wireless network 106. As depicted in FIG. 8, the computing environment 800 comprises at least one data processing module 806 that is equipped with a control module 802 and an Arithmetic Logic Unit, ALU 804, a plurality of networking devices 808 and a plurality Input output, I/O devices 810, a memory 812, a storage 814. The data processing module 806 may be responsible for implementing the platform and method described in FIGS. 3, and 4 respectively. For example, the data processing module 806 in some embodiments is equivalent to the controlling circuitry of the platform described above in conjunction with FIGS. 3 and 4. The data processing module 806 is capable of executing software instructions stored in memory 812. The data processing module 806 receives commands from the control module 802 in order to perform its processing. Further, any logical and arithmetic operations involved in the execution of the instructions are computed with the help of the ALU 804.

The computer program is loadable into the data processing module 806, which may, for example, be comprised in an electronic apparatus, such as the platform. When loaded into the data processing module 806, the computer program may be stored in the memory 812 associated with or comprised in the data processing module 806. According to some embodiments, the computer program may, when loaded into and run by the data processing module 806, cause execution of method steps according to, for example, any of the methods illustrated in FIGS. 3 and 4, or otherwise described herein.

The overall computing environment 800 may be composed of multiple homogeneous and/or heterogeneous cores, multiple CPUs of different kinds, special media and other accelerators. Further, the plurality of data processing modules 806 may be located on a single chip or over multiple chips.

The algorithm comprising of instructions and codes required for the implementation are stored in either the memory 812 or the storage 814 or both. At the time of execution, the instructions may be fetched from the corresponding memory 812 and/or storage 814 and executed by the data processing module 806.

In case of any hardware implementations various networking devices 808 or external I/O devices 810 may be connected to the computing environment to support the implementation through the networking devices 808 and the I/O devices 810.

The embodiments disclosed herein can be implemented through at least one software program running on at least one hardware device and performing network management functions to control the elements. The elements shown in FIG. 8 include blocks which can be at least one of a hardware device, or a combination of hardware device and software module.

With the proposed embodiment, the present interference mitigation system 200 and the method 400 offers one or more advantages by coordinating a network of TOF cameras connected either through wired or wireless medium to operate in such a way that the interference between them can be avoided. Additionally, the interference mitigation system 200 keeps track of connected camera nodes in the network of TOF camera nodes 204 and sends control/communication packets to them. The network of TOF camera nodes 204 can use these communication/control packets to keep them updated about network status which is vital/important for interference free operation of TOF cameras in the same environment. Additionally, the interference mitigation system 200 and the method 400 avoid interference by triggering different TOF cameras/network of TOF camera nodes 204 at different time intervals, once the connection is established between them. The network of TOF camera nodes 204 is synchronized to a common clock before establishing any connection between the nodes. Further, since all the hosts/TOF cameras/network of TOF camera nodes 204 are running on synchronized clock, they can communicate among themselves sharing time data not to stream on same interval. Further, as each TOF camera of the network of TOF camera nodes 204 is triggered at a specific time with calculated offsets as informed by the server camera node/first server camera node 204-A of the network 106, the interference is avoided. Additionally, the interference mitigation system 200 and the method 400 are useful in operating multiple TOF cameras of same or different wavelengths, connected in different hosts in the same environment without causing any interference. Additionally, the interference mitigation system 200 and the method 400 monitors the network of TOF camera nodes 204 for camera node entry and camera node exits and thus issue commands to the network of TOF camera nodes 204 to adjust their frame rate and stream accordingly in their specified trigger time. Additionally, the interference mitigation system 200 and the method 400 allows each TOF camera of the network of TOF camera nodes 204 to adjust the frame rate dynamically based on number of camera nodes in the network of TOF camera nodes 204, thereby operating at higher frame rate if the camera node count is less and operating at reduced frame rate if the camera node count is high. This allows multiple TOF cameras in the network of TOF camera nodes 204 to operate at maximum possible frame rate without any interference. Additionally, the interference mitigation system 200 and the method 400 can be operated on wireless networks hence avoiding the need for dedicated hardwired connection. This enables the TOF camera host to move around freely and operate without any hassle. Additionally, the interference mitigation system 200 and the method 400 provides synchronization of clocks between the network of TOF camera nodes 204 by a clock synchronization protocol, before triggering different TOF cameras at different time intervals and thereby avoiding interference. Additionally, the interference mitigation system 200 and the method 400 uses connectionless interference control protocol for transmission of communication/control packets over wireless medium. This can be also adapted in wired network as the interference control module needs no change for wired medium. Additionally, the interference mitigation system 200 and the method 400 provides control to change the framerate to four levels. This can also be modified to run at different levels of frame rates for more control over selecting the optimum framerate that the TOF camera supports. Additionally, the interference mitigation system 200 and the method 400 allows the network of TOF camera nodes 204 to consider pulse width/depth range of the TOF camera. This enables them to alter their frame rate even more efficiently since two TOF cameras streaming in the same environment with different pulse widths can operate at full frame rate as there would not be any interference. The interference control module can be made to include one more communication/control message packet to share pulse width data of the TOF camera to the network 106.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the terms. Thus, various modifications are possible of the presently disclosed system and process without deviating from the intended scope of the present invention.

What is claimed is:

1. An interference mitigation system for operating multiple Time-of-Flight (TOF) cameras, the interference mitigation system comprising:

a network of TOF camera nodes, comprising:

at least one first camera node from the network of TOF camera nodes to serve as at least one first server camera node in the network of TOF camera nodes, and one or more other TOF camera nodes from the network of TOF camera nodes to function as one or more client camera nodes in the network of TOF camera nodes;

wherein each of the at least one first server camera node and the one or more client camera nodes operate at one or more frame rates;

wherein each of the at least one first server camera node and the one or more client camera nodes comprises an interference control module, the interference control module of the at least one first server camera node is configured to:

receive, one or more control packets from at least one of a client camera node of the one or more client camera nodes; and share, the one or more control packets with the one or more client camera nodes;

wherein each client camera node from the one or more client camera nodes and the at least one first server camera node sets the one or more frame rates according to the receipt of the one or more control packets.

2. The interference mitigation system as claimed in claim 1, wherein the network of TOF camera nodes is operated in a wireless network.

3. The interference mitigation system as claimed in claim 1, wherein each of the at least first server camera node in the network of TOF camera nodes comprise a wireless adaptor with wireless communication module configured to:

enable communication between the at least one first server camera node and the one or more client camera nodes.

4. The interference mitigation system as claimed in claim 1, wherein each of the at least first server camera node in the network of TOF camera nodes comprise a time synchronization module configured to:

synchronize clocks of each of the at least one first server camera node and the one or more client camera nodes, wherein the synchronization of the clocks synchronizes operation of the one or more client camera nodes with the at least one first server camera node.

5. The interference mitigation system as claimed in claim 1, wherein the interference control module configured to set the one or more frame rates according to at least one of: a total number of the one or more client camera nodes upon receipt of the control packet, or when there is a change in the total number and TOF camera node ID.

6. The interference mitigation system as claimed in claim 1, wherein the interference control module configured to:

receive, one of an exit request or an entry request from one of the at least one first server camera node or one or more client camera nodes from the network of TOF camera nodes, the one or more client camera nodes and the at least one first server camera node set the one or more frame rates for the one or more client camera nodes and the at least one first server camera node according to the exit request or the entry request.

7. The interference mitigation system as claimed in claim 1, wherein the interference control module configured to:

receive an exit request from the at least one first server camera node;

transmit a notification about the exit of at least one first server camera node to the one or more client camera nodes; and select, at least one second camera node from the one or more client camera nodes as a second server camera node, wherein the selection of the at least one second camera node is performed according to a selection priority set by the at least one first server camera node.

8. The interference mitigation system as claimed in claim 1, wherein the at least one first server camera node is configured to:

receive, a connection request from a new TOF camera node in the wireless network;

connect the new TOF camera node as a new client camera node with the one or more client camera nodes; and transmit the at least one control packet to the new client camera node along with the one or more client camera nodes, wherein the one or more client camera nodes and the at least one first server camera node modify the one or more frame rates of each of the new client camera node along with the one or more client camera nodes and the at least one first server camera node, wherein the one or more frame rates are modified by decreasing each frame rate within a predefined range of the one or more frame rates.

9. The interference mitigation system as claimed in claim 1, wherein the at least one first server camera node is configured to:

receive, a disconnection request from at least one of a client camera node of the one or more client camera nodes in the wireless network;

disconnect at least one of the client camera node from the at least first server camera node in the wireless network based on the disconnect request, wherein the at least one of the client camera node is a disconnected camera node; and transmit the at least one control packet to each of the one or more client camera nodes other than the disconnected camera node, wherein the one or more client camera nodes and the at least one first server camera node modify the one or more frame rates of each of the one or more client camera nodes other than the disconnected camera node and the at least first server camera node by increasing each frame rate within a predefined range of the one or more frame rates.

10. The interference mitigation system as claimed in claim 1, wherein the at least one control packet comprises data about a number of TOF camera nodes in the network of TOF camera nodes connected in the wireless network, TOF camera node ID for each of TOF camera node arranged to receive the at least one control packet, and a universal trigger time for each of TOF camera node.

11. The interference mitigation system as claimed in claim 10, wherein each of the at least one first server camera node or the one or more client camera nodes calculate a respective trigger time based on the universal trigger time and a TOF camera node ID, obtained through the control packet, wherein each of the at least one first server camera node and the one or more client camera nodes emits Infrared Rays (IR) to capture distance data according to the respective trigger time.

12. The interference mitigation system as claimed in claim 1, wherein the control packet is transmitted according to one of an exit request or an entry request received from one of the at least one first server camera node or the one or more client camera nodes in the network of TOF camera nodes.

13. A method of operating multiple Time-of-Flight (TOF) cameras, the method comprising:

selecting, at least one first camera node from a network of TOF camera nodes to serve as at least one first server camera node in the network of TOF camera nodes;

configuring, one or more other TOF camera nodes from the network of TOF camera nodes to function as one or more client camera nodes in the network of TOF camera nodes, wherein each of the at least one first server camera node and the one or more client camera nodes operate at one or more frame rates, and wherein each of the at least one first server camera node and the one or more client camera nodes comprises an interference control module;

receiving, through the interference control module of the at least one first server camera node, one or more control packets from at least one of a client camera node of the one or more client camera nodes;

sharing, through the interference control module of the at least one first server camera node, the one or more control packets with the one or more client camera nodes; and setting, through each client camera node from the one or more client camera nodes and the at least one first server camera node, the one or more frame rates according to the receipt of the one or more control packets.

14. The method as claimed in claim 13, wherein the network of TOF camera nodes is operated in a wireless network.

15. The method as claimed in claim 13, comprising:

enabling, through a wireless adaptor with wireless communication module of the at least first server camera node, communication between the at least one first server camera node and the one or more client camera nodes.

16. The method as claimed in claim 13, comprising:

synchronizing, through a time synchronization module, clocks of each of the at least one first server camera node and the one or more client camera nodes, wherein the synchronization of the clocks synchronizes operation of the one or more client camera nodes with the at least one first server camera node.

17. The method as claimed in claim 13, comprising:

setting, through the interference control module, the one or more frame rates according to at least one of: a total number of the one or more client camera nodes upon receipt of the control packet, or when there is a change in the total number and TOF camera node ID.

18. The method as claimed in claim 13, comprising:

receiving, through the interference control module, one of an exit request or an entry request from one of the at least one first server camera node or the one or more client camera nodes from the network of TOF camera nodes; and setting, through the one or more client camera nodes and the at least one first server camera node, the one or more frame rates for the one or more client camera nodes and the at least one first server camera node according to the exit request or the entry request.

19. The method as claimed in claim 18, comprising:

receiving, through the interference control module, the exit request from the at least one first server camera node;

transmitting, through the interference control module, a notification about the exit of at least one first server camera node to the one or more client camera nodes; and selecting, through the interference control module, at least one second camera node from the one or more client camera nodes as the server camera node, wherein the selection of the at least one second camera node is performed according to a selection priority set by the at least one first server camera node.

20. The method as claimed in claim 13, comprising:

receiving, through the at least one first server camera node, a connection request from a new TOF camera node in the wireless network;

connecting, through the at least one first server camera node, the new TOF camera node as a new client camera node with the one or more client camera nodes; and transmitting, through the at least one interference control module, the at least one control packet to the new client camera node along with the one or more client camera nodes; and modifying, through the one or more client camera nodes and the at least one first server camera node, the one or more frame rates of each of the new client camera node along with the one or more client camera nodes and the at least one first server camera node, wherein the one or more frame rates are modified by decreasing each frame rate within a predefined range of the one or more frame rates.

21. The method as claimed in claim 13, comprising:

receiving, through the at least one first server camera node, a disconnection request from at least one of a client camera node of the one or more client camera nodes in the wireless network;

disconnecting, through the at least one first server camera node, at least one of the client camera node from the at least first server camera node in the wireless network based on the disconnect request, wherein the at least one of the client camera node is a disconnected camera node;

transmitting, through the at least one interference control module, the at least one control packet to each of the one or more client camera nodes other than the disconnected camera node; and modifying, through the one or more client camera nodes and the at least one first server camera node, the one or more frame rates of each of the one or more client camera nodes other than the disconnected camera node and the at least first server camera node by increasing each frame rate within a predefined range of the one or more frame rates.

22. The method as claimed in claim 13, wherein the at least one control packet comprises data about a number of TOF camera nodes in the network of TOF camera nodes connected in the wireless network, TOF camera node ID for each of TOF camera node arranged to receive the at least one control packet, and a universal trigger time for each of TOF camera node.

23. The method as claimed in claim 22, wherein each of the at least one first server camera node or the one or more client camera nodes calculate a respective trigger time based on the universal trigger time and the TOF camera node ID, obtained through the control packet, wherein each of the at least one first server camera node and the one or more client camera nodes emits IR to capture distance data according to the respective trigger time.

24. The method as claimed in claim 13, wherein the control packet is transmitted according to one of an exit request or an entry request received from one of the at least one first server camera node or one or more client camera nodes in the network of TOF camera nodes.

* * * * *